United States Patent [19]
Berg et al.

[11] Patent Number: 5,722,071
[45] Date of Patent: Feb. 24, 1998

[54] PORTABLE RECEIVER INCLUDING TRANSDUCER FOR NOTIFYING USER OF MESSAGES RECEIVED IN A REMOTE MOBILE COMMUNICATIONS DEVICE

[75] Inventors: Roger William Berg, Carlsbad; Yutaka Sato; Choon-Huat Nick Lim, both of San Diego, all of Calif.

[73] Assignees: Sony Corporation, Tokyo, Japan; Sony Electronics Inc., Park Ridge, N.J.

[21] Appl. No.: 625,436

[22] Filed: Mar. 27, 1996

[51] Int. Cl.[6] .................................................. H04B 1/00
[52] U.S. Cl. .................. 455/426; 340/311.1; 340/407.1; 340/825.44; 455/31.2; 455/458; 455/567
[58] Field of Search .................... 455/54.1, 88, 11.1, 455/351, 404, 426, 445, 458, 521, 567, 31.2; 379/57, 63, 211; 340/825.44, 539, 407.1, 311.1

[56] References Cited

U.S. PATENT DOCUMENTS

| | | | |
|---|---|---|---|
| H610 | 3/1989 | Focarile et al. | 340/311.1 X |
| 4,005,269 | 1/1977 | Willis | 379/61 |
| 4,336,524 | 6/1982 | Levine | 340/311.1 |
| 4,661,972 | 4/1987 | Kai | 379/57 |
| 4,745,632 | 5/1988 | Duffy | 379/63 X |
| 4,833,709 | 5/1989 | Pasinski et al. | 379/374 |
| 4,906,989 | 3/1990 | Kasugai | 340/825.44 |
| 5,315,636 | 5/1994 | Patel | 379/211 X |
| 5,581,244 | 12/1996 | Jokimies et al. | 340/825.44 |

*Primary Examiner*—Thomas Mullen
*Attorney, Agent, or Firm*—Lise A. Rode, Esq.; Jerry A. Miller

[57] ABSTRACT

A remote receiving system and apparatus for alerting a mobile communications device user of an incoming call. The remote receiving apparatus is portable and receives a coded radiofrequency signal, including a first preselected identification code, transmitted from the mobile communications device, such transmission occurring upon receipt of the incoming call in the mobile communications device. The remote receiving apparatus further includes a detector for demodulating the received coded radiofrequency signal in order to reproduce the first preselected identification code, a low-pass filter for filtering the demodulated signal, an analog-to-digital converter for converting the filtered signal into a digital signal, including the first preselected identification code, a logic unit for determining whether the first preselected identification code matches a second preselected identification code stored in the logic unit, and an alert transducer to alert the user when the logic unit determines that the first preselected identification code matches the second preselected identification code. By using a coded radiofrequency signal which includes a preselected identification code unique to the particular remote receiving apparatus, a portable and convenient device is provided which can accurately notify a user of incoming messages received in a mobile communications device which is at a remote location from the user.

32 Claims, 2 Drawing Sheets

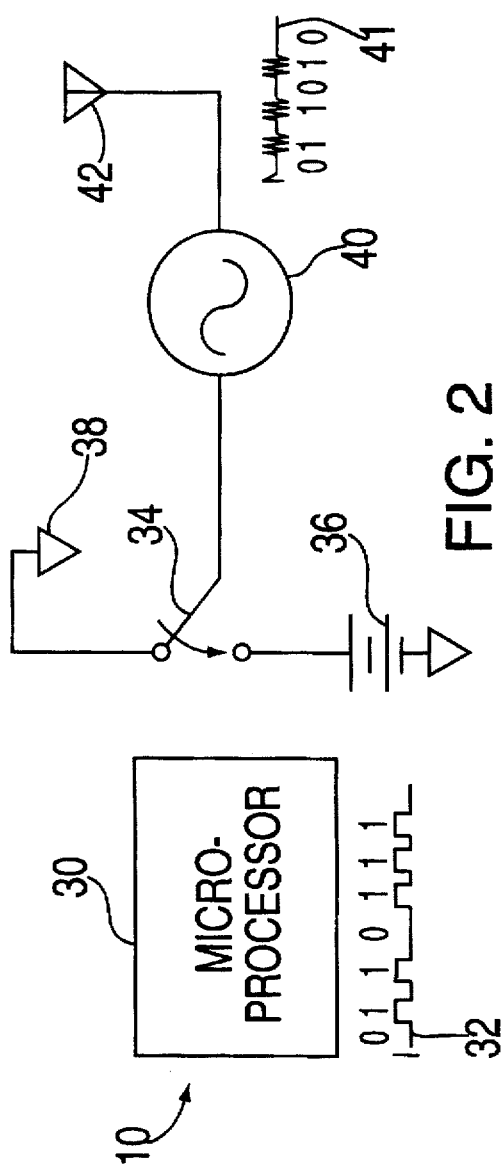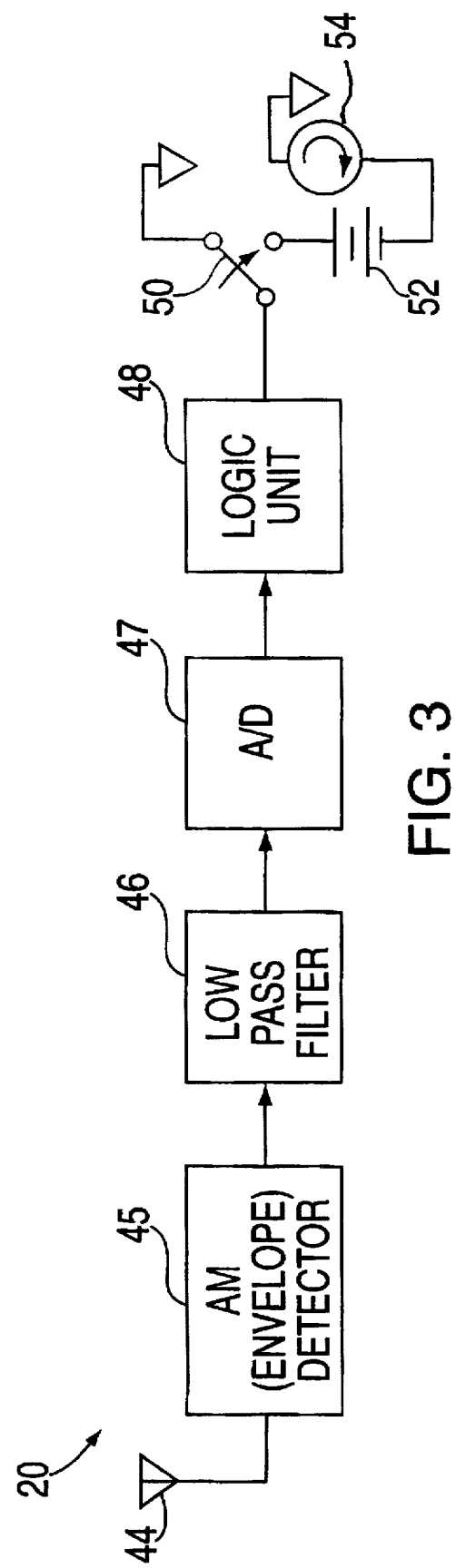

PORTABLE RECEIVER INCLUDING TRANSDUCER FOR NOTIFYING USER OF MESSAGES RECEIVED IN A REMOTE MOBILE COMMUNICATIONS DEVICE

BACKGROUND OF INVENTION

1. Field of the Invention

The present invention relates to telecommunications devices. More specifically, this invention relates to a portable receiver including transducer which is capable of notifying a user of messages received in a remote mobile communications device, such as a cellular or mobile phone.

2. General Background

In recent years the popularity of mobile communications devices such as cellular phones, mobile phones, and pagers has increased as the cost of the particular device decreases and the capacities and capabilities of the devices and respective systems increases.

Although there has been much advance in the reduction of the size of these mobile communications units, a user will often still find the unit to be large or cumbersome enough so that he will not carry it around with him at all times, and will place the unit on a nearby table surface or car seat or the like. If the user is at some distance from the thus-placed unit, he may not be able to hear its alarm or other transducer when it is activated upon the receipt of an incoming call. As a result, the user may miss an important call or message.

One solution which has been suggested to overcome the foregoing problem is the use of a smaller receiving device which is separate from a mobile communications unit, and which may be remotely activated when an incoming call is received in a user's mobile communications unit. One such device is a radiofrequency receiver which includes a vibrator, such devise being activated when in close proximity to any radiofrequency (RF) energy within the 800 MHZ band such as that emitted by the user's mobile communications unit during an incoming call. The problem with such a device is that it may respond to energy outside this band and thus may give the user undesirable false alerts with respect to incoming calls; that is, as the vibrator responds to any RF excitation energy falling within a narrow radius around the device and having a frequency which falls within the 800 MHZ cellular band, the vibrator may be accidentally activated in cases other than when excitation energy is being emitted from the user's mobile communications unit upon the receipt of an incoming call. For example, such vibrator may be activated when in the presence of the RF energy field generated by a cellular phone other than the user's. Alternatively, the receiver's transducer may be accidentally activated by RF energy generated by the user's own mobile unit during the placement of an outgoing Call, or during the mobile unit's periodic location registration transmission signal. In each of these cases, the user will return to answer his phone, only to discover that no incoming call was in fact received. Clearly, this is undesirable.

Therefore, it would be desirable to provide a portable remote receiver including transducer which could more accurately notify a user of incoming messages received in a mobile communications unit.

SUMMARY OF THE INVENTION

Accordingly, it is one object of the present invention to provide a device which can notify a user of incoming messages received in a remote mobile communications unit.

It is another object of the present invention to provide a remote incoming call alert device which can eliminate false alerts, and thus accurately notify a user of incoming messages received in a mobile communications unit.

It is still another object of the present invention to provide a portable remote device which can accurately notify a user of incoming messages received in a mobile communications unit by using the publicly-available radiofrequency bandwidth.

It is yet another object of the present invention to provide a portable remote device which can accurately notify a user of incoming messages received in a mobile communications unit by using coded radiofrequency signals.

Therefore, in accordance with one aspect of the present invention, there is provided a system for alerting a mobile communications device user of an incoming call. Such system includes a transmitting unit and a remote alert receiver. The transmitting unit transmits a coded radiofrequency signal from said mobile communications device, the coded radiofrequency signal including a first preselected identification code. The remote alert receiver decodes the received coded radiofrequency signal to reproduce the first preselected identification code, and includes an alerting transducer which is activated upon receipt of the reproduced first preselected identification code when the first preselected identification code matches a second preselected identification code stored in the remote alert receiver.

In accordance with another aspect of the present invention, the transmitting unit includes a microprocessor for providing a data signal including the first preselected identification code, a first switch connected to receive the data signal including the first preselected identification code, the data signal closing the first switch when the data signal has a first value, and an oscillator connected to the first switch, wherein when the first switch is closed, the oscillator modulates the data signal including the first preselected identification code to provide the coded radiofrequency signal.

In accordance with one embodiment of the present invention, the remote alert receiver includes a receiving antenna for receiving from the mobile communications device, the coded radiofrequency signal including a first preselected identification code. The remote receiver further includes detector devices for demodulating the received coded radiofrequency signal in order to reproduce the first preselected identification code, a logic unit for determining whether the first preselected identification code matches a second preselected identification code stored in a memory in the remote alert receiver, and an alert transducer to alert the user when the logic unit determines that the first preselected identification code matches the second preselected identification code. The detector devices may include an envelope detector for demodulating an envelope detector for demodulating the coded radiofrequency signal to provide the first preselected identification code, a low pass filter connected to receive the demodulated signal and to provide a filtered signal including the first preselected identification code, and an analog-to-digital converter for converting the filtered signal into a digital signal including the first preselected identification code.

In accordance with one embodiment of the present invention, the alert transducer is a rotating motor with uneven weight.

In accordance with another embodiment of the invention, the alert transducer is a piezoelectric transducer.

The features of the present invention believed to be novel are set forth with particularity in the appended claims. However, the invention itself may be best understood with

BRIEF DESCRIPTION OF THE DRAWINGS

FIG. 2 shows a schematic of one embodiment of the low power transmitter of the present invention.

FIG. 3 shows a schematic of one embodiment of the remote alert receiver including transducer of the present invention.

DETAILED DESCRIPTION OF THE INVENTION

Figure 1:
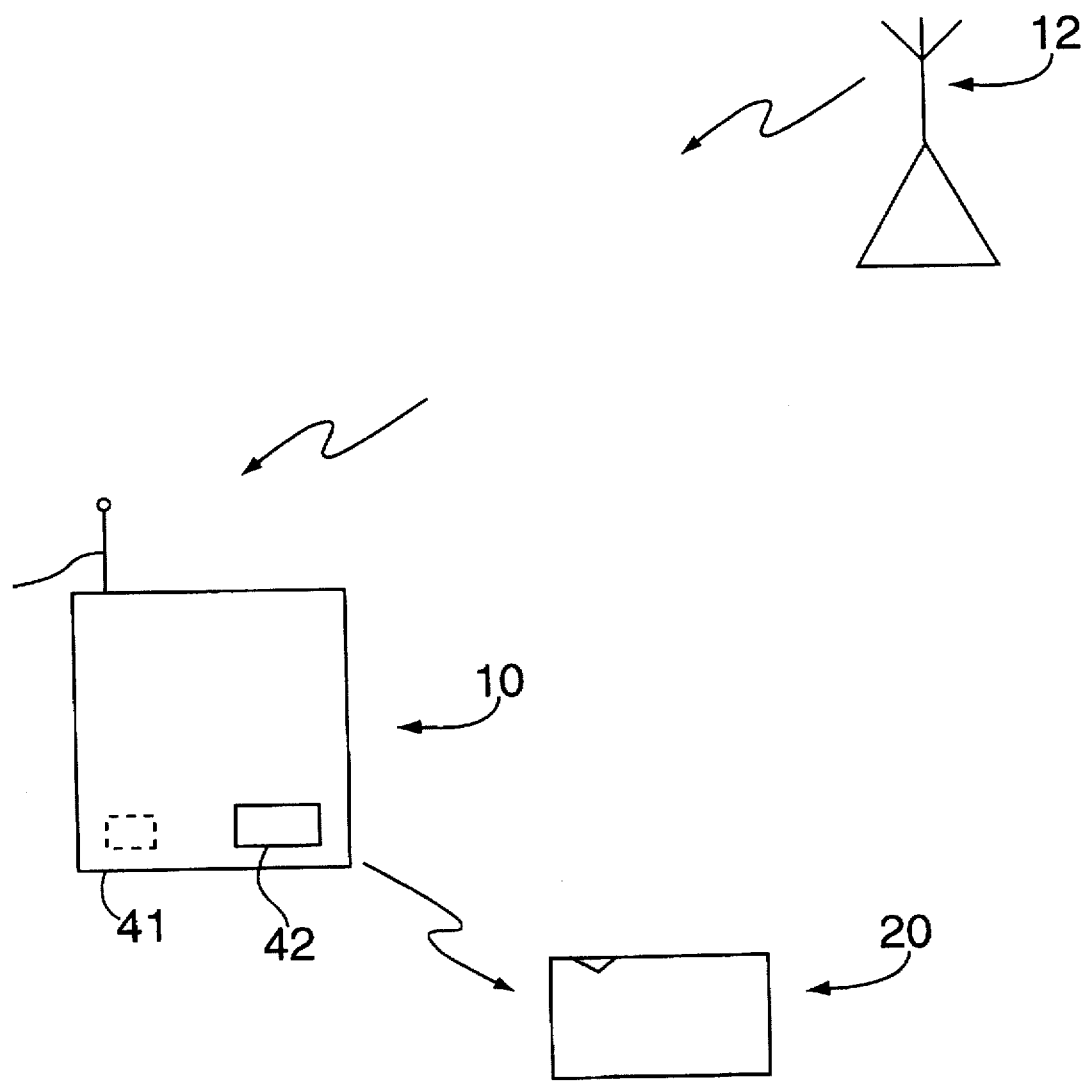
FIG. 1 shows a schematic view of an embodiment of the system of the present invention.

Referring to FIG. 1, a description of the operation of the remote notification device of the present invention will be described. As known in the art, when an incoming call is received in mobile unit 10 from base station 12, the unit 10 will ordinarily respond to the incoming call by activating a vibrator, or similar transducer (not shown), in the mobile unit 10 to alert the user of such call if the transducer is not muted. In accordance with the present invention, however, once the incoming call is received in the mobile unit 10, a low power transmitter may be activated to transmit a coded RF signal to a remote alert receiver 20, such receiver 20 being activated only upon receipt of such coded RF signal. Thus unlike the prior art remote vibrator discussed above, the remote alert receiver 20 will not be activated in the presence of "random" RF energy such as may be generated by another cellular phone proximate to the remote alert receiver 20 or such as that RF energy generated by the user's own mobile unit 10 during the placement of an outgoing call, or during the mobile unit's periodic location registration transmission signal.

More specifically, one embodiment of the remote notification receiver and system of the present invention is shown in FIGS. 2 and 3. A microprocessor 30 in the mobile unit 10 generates a data signal 32 which controls a switch 34 to alternate between a voltage source 36 and ground 38. This data signal includes a first preselected identification code corresponding to a second identical code stored in the remote alert receiver 20 of the present invention (to be described in detail in the forthcoming paragraphs). The system uses a large enough number of codes so that each of the remote alert receivers 20 can be assigned a unique identification code within the system. For example, this may be carried out using asynchronous data transmission such as on-off keying (OOK), or simple air interface protocol of AM. This is particularly desirable because such protocol make use of the publicly-available radiofrequency airwaves, and therefore does not require additional licensing. For simplicity and convenience, the system of the present invention will be described with reference to this type of coding scheme; of course, other coding schemes as known to those skilled in the art may instead be used, and it is intended that the present invention embrace all such alternatives.

In the embodiment using on-off keying (OOK) data communication may be accomplished using the well-known asynchronous data transmission scheme, so that a synchronizing clock signal is not required. An asynchronous data signal 32 which includes a first preselected identification code unique to an associated remote alert receiver (to be described later) and a start and stop bit, is generated from the microprocessor 30. When the asynchronous data signal 32 goes high (value=1), the switch 34 is caused to be connected to the voltage source 36, which is in turn connected to an oscillator 40, which is preferably a voltage controlled oscillator 40, but may be any oscillator. (It will also be appreciated, of course, that the switch 34 can be caused to be closed when the asynchronous data signal 32 from the microprocessor 30 goes low (value=0)).

As known in the art, the voltage controlled oscillator 40 produces an AC output signal, 41, the frequency of which is linearly proportional to the input voltage, $V_s$, over the voltage source 36. Each time the asynchronous data signal 32 goes high, switch 34 is closed across voltage source 36, and voltage-controlled oscillator 40 produces a carrier burst, the duration of which extends for the length of time the switch 34 is closed across voltage source 36. The frequency of each burst is preset, and, again, is preferably in the public-available radiofrequency bandwidth, in order to obviate the need for additional licensing. It will be appreciated that the beginning or cessation of a frequency burst represents a change in a bit value in the first preselected identification code. The first preselected identification code is thus still readily identifiable in the modulated AC signal 41. The mobile unit's transmitting antenna 42 then receives the modulated AC signal 41 from the voltage controlled oscillator 40, and transmits such signal to the remote alert receiver 20.

Upon receipt of the transmitted signal at antenna 44 of remote alert receiver 20, a conventional AM envelope detector 45 demodulates the AC signal to reproduce a voltage signal, the amplitude of which represents the value of each of the bits of the first preselected identification code This reproduced voltage signal is provided to a low pass filter 46 to smooth out the signal, and then is supplied to an analog-to-digital converter 47, wherein the analog signal is digitized, and the first preselected identification code is thus reproduced. The thus digitized signal is provided to the logic unit 48, in which a second preselected identification code is stored or preset. As set forth above, this code is unique to the remote alert receiver 20.

The logic unit 48 interrogates the signal from the analog-to-digital converter 47 to determine if the reproduced, or first, preseleoted identification code matches the second preselected identification code stored in the logic unit 48. The logic unit may be realized by the use of a simple comparator which is connected to receive and compare the reproduced preselected identification code and an output from a memory, such as a read-only memory (ROM), in which the second preselected identification code is stored. However, similar logic circuits known in the art, may be used.

If the reproduced preselected identification code matches the second preselected identification code stored in logic unit 48, the logic unit 48 will output a signal to close switch 50. The closing of switch 50 causes a voltage from the voltage source 52 to be applied to transducer 54, which, in turn, is caused to vibrate. Thus, the user of mobile unit 10 is alerted.

In a preferred embodiment, operation of the system of the present invention occurs only upon the receipt of an incoming call in mobile unit 10 when the mobile unit's transducer 56 is muted. That is, transmission of a coded RF signal from mobile unit 10 to remote alert receiver 20 and activation of a transducer 54 in the latter when the code contained in the received RF signal matches a second preselected identification code stored in logic unit 48 will occur only if microprocessor 30 interrogates the transducer mute switch (not shown) and determines that such mute switch is on. It will be appreciated, however, that the system of the present invention is not so limited, and operation of the system of the present invention may be designed to occur even if the mute switch is not on or activated.

Because the size of the remote alert receiver 20 is small, it may be conveniently and easily carried by the user. Alternatively, the remote alert receiver 20 may be worn directly on the user's body directly, or it may be embodied in the form of a belt, pin, bracelet, or the like and then worn as an accessory. The vibrating transducer 54 may be realized as a conventional rotating motor having uneven weight, or a piezoelectric transducer which operates at either very high, or very low, inaudible frequencies.

It is therefore apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. Other embodiments will occur to those skilled in the art. Accordingly, it is intended that the present invention embrace all such alternatives, modifications and variations as fall within the scope of the appended claims.

What is claimed is:

1. A method of alerting a user of a mobile communications device of an incoming call, comprising the steps of:
   transmitting a coded radiofrequency signal from said mobile communications device to a remote alert receiver upon receipt of said incoming call in said mobile communications device, said remote alert receiver having a first preselected identification code;
   receiving said coded radiofrequency signal in said remote alert receiver;
   decoding said coded radiofrequency signal in said remote alert receiver to provide said first preselected identification code; and,
   activating a transducer in said remote alert receiver to alert said user after decoding said first preselected identification code, if said first preselected identification code matches a second preselected identification code stored in said remote alert receiver.

2. The method of claim 1, further comprising the steps of:
   providing a data signal from controller means of said mobile communications device to a first switch of said mobile communications device, wherein said data signal includes said first preselected identification code;
   closing said first switch when said data signal has a first value, in order to provide an output signal to oscillator means of said mobile communications device; and,
   modulating said output signal using said oscillator means to provide said coded radiofrequency signal.

3. The method of claim 2, wherein said data signal comprises an asynchronous data signal.

4. The method of claim 2, wherein said modulating step comprises frequency modulation of said output signal.

5. The method of claim 4, wherein said oscillator means includes a voltage controlled oscillator.

6. The method of claim 1, wherein said decoding step comprises:
   demodulating said coded radiofrequency signal to provide a detected signal including said first preselected identification code;
   converting said detected signal into a digital signal including said first preselected identification code; and,
   comparing said first preselected identification code with a second preselected identification code stored a memory in said remote alert receiver.

7. The method of claim 6, wherein said demodulating step is carried out in detector means, wherein said detector means includes an envelope detector for providing an output signal having a waveform, the shape of which is the same as that of said coded radiofrequency signal, and a low pass filter connected to receive said output signal from said envelope detector.

8. The method of claim 6, wherein said converting step is carried out in an analog-to-digital converter.

9. The method of claim 6, wherein said comparing step is carried out in a comparator.

10. The method of claim 1, wherein said activating step comprises:
    closing a second switch in said remote alert receiver when said first preselected identification code matches said second preselected identification code, wherein said second switch causes said transducer in said remote alert receiver to be connected across a voltage source in said remote alert receiver.

11. A method of alerting a user of a mobile communications device of an incoming call, comprising the steps of:
    receiving a coded radiofrequency signal in a remote alert receiver, said remote alert receiver having a first preselected identification code;
    decoding said received coded radiofrequency signal in said remote alert receiver; and,
    activating a transducer in said remote alert receiver to alert said user when said decoded radiofrequency signal includes said first preselected identification code, said radiofrequency signal including said first preselected identification code when said coded radiofrequency signal is generated from said mobile communications device upon receipt of said incoming call in said mobile communications device.

12. The method of claim 11, wherein said decoding step comprises:
    demodulating said coded radiofrequency signal to provide a detected signal including said first preselected identification code;
    converting said detected signal into a digital signal including said first preselected identification code; and,
    comparing said first preselected identification code with a second preselected identification code stored in logic means in said remote alert receiver.

13. The method of claim 12, wherein said demodulating step is carried out in detector means, wherein said detector means includes an envelope detector for providing an output signal having a waveform, the shape of which is the same as that of said coded radiofrequency signal, and a low pass filter connected to receive said output signal from said envelope detector.

14. The method of claim 12, wherein said converting step is carried out in an analog-to-digital converter.

15. The method of claim 12, wherein said comparing step is carried out in a comparator.

16. A system for alerting a mobile communications device user of an incoming call comprising:
    transmitting means, including coding means for providing a coded radiofrequency signal from said mobile communications device, said coded radiofrequency signal including a first preselected identification code; and,
    remote alert receiving means, including decoding means for decoding said coded radiofrequency signal to reproduce said first preselected identification code, and further including alerting means, said alerting means being activated upon receipt of said reproduced first preselected identification code from said decoding means when said first preselected identification code matches a second preselected identification code stored in said decoding means.

17. The system of claim 16, wherein said coding means comprises:

controller means for providing a data signal including said first preselected identification code;

a first switch connected to receive said data signal including said first preselected identification code, said data signal closing said first switch when said data signal has a first value;

oscillator means connected to said first switch, wherein when said first switch is closed, said oscillator means modulates said data signal including said first preselected identification code to provide a coded radiofrequency signal.

18. The system of claim 17, wherein said data signal is an asynchronous data signal.

19. The system of claim 17, wherein said oscillator means includes a voltage controlled oscillator.

20. The system of claim 16, wherein said transmitting means includes a radiofrequency antenna.

21. The system of claim 16, wherein said decoding means comprises:

detector means for demodulating said coded radiofrequency signal to provide said first preselected identification code; and, logic means for comparing said first preselected identification code with said second preselected identification code.

22. The system of claim 21, wherein said detector means comprises:

an envelope detector for providing an output signal having a waveform, the shape of which is the same as that of said coded radiofrequency signal;

a low pass filter connected to receive said output signal from said envelope detector and for providing a filtered output signal; and, an analog-to-digital converter for converting said filtered output signal into a digital signal.

23. The system of claim 21, wherein said logic means includes a second switch, said second switch connected to activate said alerting means when said first preselected identification code matches said second preselected identification code.

24. The system of claim 16, wherein said alerting means includes a rotating motor having uneven weight.

25. The system of claim 16, wherein said alerting means includes a piezoelectric transducer.

26. A system for alerting mobile communications device user of an incoming call comprising:

a transmitter including:

a microprocessor for providing a data signal including a first preselected identification code;

a first switch connected to receive said data signal including said first preselected identification code, said data signal closing said first switch when said data signal has a first value;

a voltage-controlled oscillator connected to said first switch, wherein when said first switch is closed, said voltage-controlled oscillator modulates said data signal including said first preselected identification code to provide a coded radiofrequency signal;

transmitting antenna means in said for transmitting said coded radiofrequency signal; and, a remote alert receiver including:

an envelope detector for demodulating said coded radiofrequency signal to provide said first preselected identification code;

a low pass filter connected to receive said demodulated signal and to provide a filtered signal including said first preselected identification code;

an analog-to-digital converter for converting said filtered signal into a digital signal including said first preselected identification code;

a logic unit for comparing said first preselected identification code with a second preselected identification code stored in said logic unit;

an alert transducer; and, a second switch connected to activate said alert transducer when said first preselected identification code matches said second preselected identification code.

27. A remote receiving apparatus for alerting a mobile communications device user of an incoming call, comprising:

receiving means for receiving from said mobile communications device, a coded radiofrequency signal including a first preselected identification code, said mobile communications device transmitting said coded radiofrequency signal upon receipt of said incoming call in said mobile communications device;

detecting means for demodulating said received coded radiofrequency signal in order to reproduce said first preselected identification code;

logic means for determining whether said first preselected identification code matches a second preselected identification code stored in said logic means;

alerting means including a transducer to alert said user when said logic means determines that said first preselected identification code matches said second preselected identification code.

28. A remote receiving apparatus for alerting a mobile communications device user of an incoming call, comprising:

a receiving antenna for receiving from said mobile communications device, a coded radiofrequency signal including a first preselected identification code, said mobile communications device transmitting said coded radiofrequency signal upon receipt of said incoming call in said mobile communications device;

detecting means for demodulating said received coded radiofrequency signal in order to reproduce said first preselected identification code;

a memory for storing a second preselected identification code;

a logic unit for determining whether said first preselected identification code matches said second preselected identification code stored in said memory;

alerting means to alert said user when said logic means determines that said first preselected identification code matches said second preselected identification code.

29. The apparatus of claim 28, wherein said detecting means comprises:

an envelope detector for providing an output signal having a waveform, the shape of which is the same as that of said coded radio frequency signal;

a low pass filter connected to receive said output signal from said envelope detector and for providing a filtered output signal; and, an analog-to-digital converter for converting said filtered output signal into a digital signal including said first preselected identification code.

30. The apparatus of claim 28, wherein said alerting means comprises:

an alert transducer; and, a first switch connected to activate said alert transducer when said first preselected identification code matches said second preselected identification code.

31. The apparatus of claim 30, wherein said alert transducer comprises a rotating motor with uneven weight.

32. The apparatus of claim 30, wherein said alert transducer comprises a piezoelectric transducer.

* * * * *